United States Patent
Navarra Pruna et al.

(10) Patent No.: US 9,238,312 B2
(45) Date of Patent: Jan. 19, 2016

(54) PLASTIC INJECTION MOULD WITH INNER AIR EXTRACTION AND EXTRACTION METHOD FOR EXTRACTING THE AIR CARRIED OUT WITH SAID MOULD

(75) Inventors: Alberto Navarra Pruna, Sant Just Desvern (ES); Jorge de Fortuny Pala, Sant Just Desvern (ES)

(73) Assignee: COMERCIAL DE UTILES Y MOLDES, S.A. (ES)

( * ) Notice: Subject to any disclaimer, the term of this patent is extended or adjusted under 35 U.S.C. 154(b) by 0 days.

(21) Appl. No.: 13/876,520

(22) PCT Filed: Sep. 29, 2011

(86) PCT No.: PCT/EP2011/066967
§ 371 (c)(1),
(2), (4) Date: May 8, 2013

(87) PCT Pub. No.: WO2012/041950
PCT Pub. Date: Apr. 5, 2012

(65) Prior Publication Data
US 2013/0221574 A1  Aug. 29, 2013

(30) Foreign Application Priority Data
Sep. 29, 2010  (ES) .................................. 201031442

(51) Int. Cl.
*B29C 45/40*  (2006.01)
*B29C 37/00*  (2006.01)
*B29C 45/34*  (2006.01)

(52) U.S. Cl.
CPC ............. *B29C 37/0003* (2013.01); *B29C 45/34* (2013.01); *B29C 45/401* (2013.01); *B29C 2045/4015* (2013.01)

(58) Field of Classification Search
CPC ................... B29C 2045/4015; B29C 37/0003; B29C 45/34; B29C 45/401
USPC .............. 264/328.14, 571; 425/156, 546, 556
See application file for complete search history.

(56) References Cited

U.S. PATENT DOCUMENTS 3,736,958 A * 6/1973 Rostad ........................ 137/625.6
3,858,841 A * 1/1975 Haynes ........................... 251/43

(Continued)

FOREIGN PATENT DOCUMENTS

EP          385762    *  9/1990
EP     1074367 A2      2/2001

(Continued)

OTHER PUBLICATIONS

International Search Report for corresponding application No. PCT/EP2011/066967 filed Sep. 29, 2011; Mail date Dec. 12, 2011.

(Continued)

*Primary Examiner* — Jill Heitbrink
(74) *Attorney, Agent, or Firm* — Cantor Colburn LLP

(57) ABSTRACT

A plastic injection mold which allows extracting the air from inside it during the injection process, and an extraction method, where the mold includes closing means, one or more injection cavities provided with at least one injection nozzle for introducing the hot material in a liquid state and at least one ejector device formed by a housing for an ejector pin responsible for extracting the part already molded, where an air duct connected to a vacuum pump or a suction device intercepts the housings of the ejector pins causing a suction of the air from inside the mold.

7 Claims, 3 Drawing Sheets

(56) References Cited

U.S. PATENT DOCUMENTS

| | | | |
|---|---|---|---|
| 4,573,900 A | * | 3/1986 | Smith .......................... 425/157 |
| 4,797,236 A | * | 1/1989 | Kojima .................. B29C 45/34 |
| | | | 264/102 |
| 4,822,269 A | | 4/1989 | Kamiyama et al. |
| 4,874,308 A | | 10/1989 | Atlas et al. |
| 6,491,508 B1 | | 12/2002 | Kurosawa et al. |
| 7,158,854 B1 | * | 1/2007 | Kolander ..................... 700/200 |
| 2004/0022885 A1 | | 2/2004 | Suzuki |
| 2006/0093702 A1 | | 5/2006 | Andersen et al. |
| 2006/0269651 A1 | | 11/2006 | Hirao |

FOREIGN PATENT DOCUMENTS

| | | |
|---|---|---|
| JP | 2004009586 A | 1/2004 |
| WO | 2010072855 A1 | 7/2010 |

OTHER PUBLICATIONS

Translation of Written Opinion for corresponding application ES201031442.

Written Opinion for corresponding application PCT/EP2011/066967 filed Sep. 29, 2011; Mail date Dec. 12, 2011.

\* cited by examiner

PLASTIC INJECTION MOULD WITH INNER AIR EXTRACTION AND EXTRACTION METHOD FOR EXTRACTING THE AIR CARRIED OUT WITH SAID MOULD

TECHNICAL FIELD

The present invention is applicable to the plastic material part injection molding industry, and more specifically to the sector of injecting molds and injection molding processes.

More specifically, the invention concerns a plastic injection mold which allows extracting the air from inside it during the injection process and an extraction method for extracting the air using said mold.

BACKGROUND OF THE INVENTION

A thermoplastic injection mold is formed, among other components, by two shaping plates, one referred to as cavity plate and another referred to as die plate, as well as a set of ejector plates where several ejector pins are housed, which will serve for ejecting the injected part.

An injection mold can have one or several shaping cavities, wherein at the time of injection the duly melted plastic material is introduced under pressure through an injection nozzle or point, until completely filling of each of the cavities.

Each mold incorporates a refrigeration circuit made up of machined boreholes in the shaping plates which serve to cool the injected plastic and set the part.

The ejector pins located in through housings structurally configured in the die plate are activated through the ejector plates, being responsible for extracting the part from the cavity once the plastic has set.

This housing does not have a uniform diameter along its entire length, instead the ejector pins are really tightly fitted, with a very narrow clearance marked by standard regulation, in the portion nearest the cavity, whereas at rest the housing has a greater diameter to prevent unnecessary friction with the ejector pins.

During the injection process the mold is closed and therefore the cavity is full of air which is gradually compressed as the plastic material is injected, reducing its volume and increasing its pressure, which complicates filling it with the plastic material.

This entire process requires, in many cases, an increase in temperature of the plastic mass as well as a greater injection pressure so that the entire mold cavity can be filled, mainly in areas with a difficult configuration, which entails a longing cooling time before being able to demold the duly set part.

In many cases, due to the temperature and pressure excess applied to the plastic material to fill the cavity, internal stresses are produced in the part itself such that the dimensional stability is lost, negatively affecting the final quality of the product.

To solve these problems some solutions are known which allow the exit of air but at the same time prevent the exit of the injected material.

These solutions include the creation of air removal conduits located in the perimeter of the cavity, usually in the area furthest from the injection point. The air mass also escapes the cavity through the small clearance between the ejector pins and their housings.

The arrangement of a plugging element in the access opening of the ejector conduit, enabling the exit of air, preventing the exit of the injected material, is also known.

This plugging element is in some cases made up of an air permeable filter and in other cases by a cap or closing element which tends to remain in an open position by action of a spring. This closing element allows removing air and closes automatically when the pressure of the injected material overcomes the pushing of the spring, thus preventing the exit of said injected material through the removal conduit, although this solution is not applicable with all materials.

These molds have several drawbacks in relation to the air removal means, the most noteworthy being that the injected material acts as a plunger pushing the air through the removal conduit, which requires greater injection pressure; and that the injected material cools more readily since it is in contact with the air, and therefore it is necessary to inject said material at a greater temperature with the subsequent energy cost. In order to achieve a greater effectiveness in removing the air it is necessary for the plugging element be located at the end opposite the injection nozzle, the molten material reaching this area with less fluidity. It is necessary to invest more energy and production costs to obtain the part during the process.

Furthermore, these problems also affect the quality of the obtained part since air bubbles are trapped in the molded parts and clearances are formed in certain configurations. The inadequate extraction of air produces grooves in the outer faces of the injected parts and during the filling of the mold the injected material is subjected to stresses which cause imperfections and deformations in the obtained parts.

BRIEF SUMMARY

The injection mold of the present invention solves the problems pointed out above while at the same time constituting an efficient alternative for the complete extraction of air from the molds.

To that end, the plastic injection mold with inner air extraction of the present invention is structured based on traditional elements of this type of molds, i.e., comprising closing means, one or more injection cavities provided with at least one injection nozzle for introducing the hot material in a liquid state and at least one ejector device formed by a set of ejector pins which with their movement through their respective housings are responsible for pushing the molded part out.

To make extracting the air from inside the cavity easier, the mold of the present invention comprises an internal circuit communicated with a vacuum pump or suction element, which will be the responsible for extracting the air from the mold cavity before and during the injection process.

This circuit is made up of a conduit, specifically drilled in the structure of the mold itself, transversely intercepting the housings of the ejector pins creating a communication of the air of the cavity through the space between the ejector pin and its housing, thus causing its suction.

Since the time available for that air extraction during the injection process is limited, so as not to increase the injection time, it is necessary to close any space so that the vacuum pump or suction element works with the greatest efficiency and performance possible. Thus, the mold of the present invention provides for the arrangement of bushing seals placed in each of the ejection elements, duly fixed in the die plate and located in the opposite portion of the shaping area or injection area to close the existing space between the ejector pin and its housing, which space in this portion has a greater clearance than the one found in the area of contact with the cavity.

Since the air which can be suctioned through the ejectors will not be sufficient in most injection methods, the mold of the present invention provides, to speed up the removal of the air from the mold cavity as much as possible, the use of a cut-off valve connected in the ejector circuit and housed in the shaping cavity itself, which is activated by means of a piston. Said piston and valve elements are also controlled by a timer responsible for indicating the time which it must be open or closed depending on the type of injection process to be performed.

Thus, from using the mold described above a method of action in the manufacture of parts by injection could be derived such that the presence of air inside the mold is prevented, which method would comprise the steps of:
 a) closing the mold;
 b) activating the air duct connected to a vacuum pump or a suction device transversely intercepting the housings of the ejector pins of the ejector devices producing the suction of the air from the mold
 c) injecting the plastic into the mold
 d) filling the mold (1); and
 f) cooling and ejecting the part
wherein the air duct and the suction device are activated throughout the entire injection of material into the mold.

BRIEF DESCRIPTION OF THE DRAWINGS

To complement the description which is being made and for the purpose of aiding to better understand the features of the invention, a set of drawings is attached to the present specification in which the following has been depicted with an illustrative and non-limiting character.

DETAILED DESCRIPTION

Figure 1:
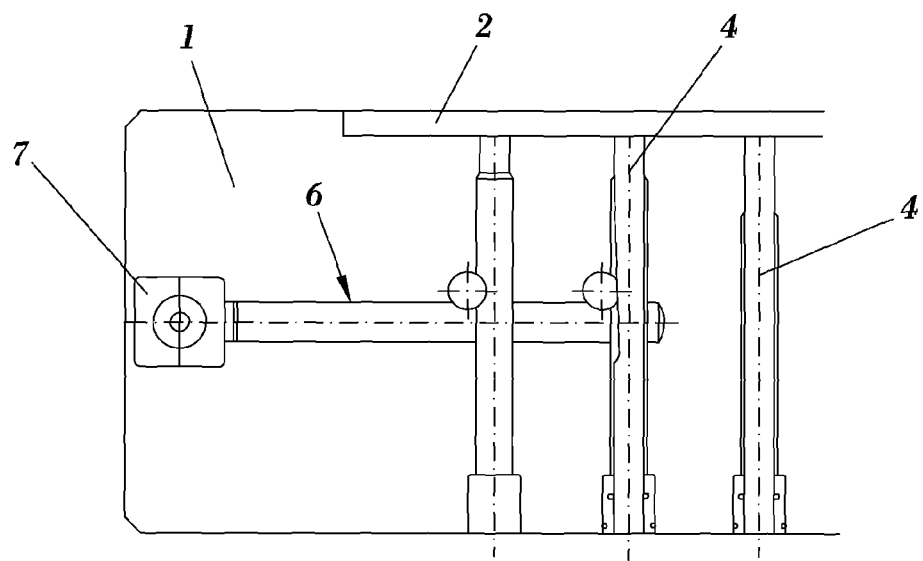
FIG. 1 shows respective schematic plan and elevational section views of an injection mold according to the present invention.
Figure 1:
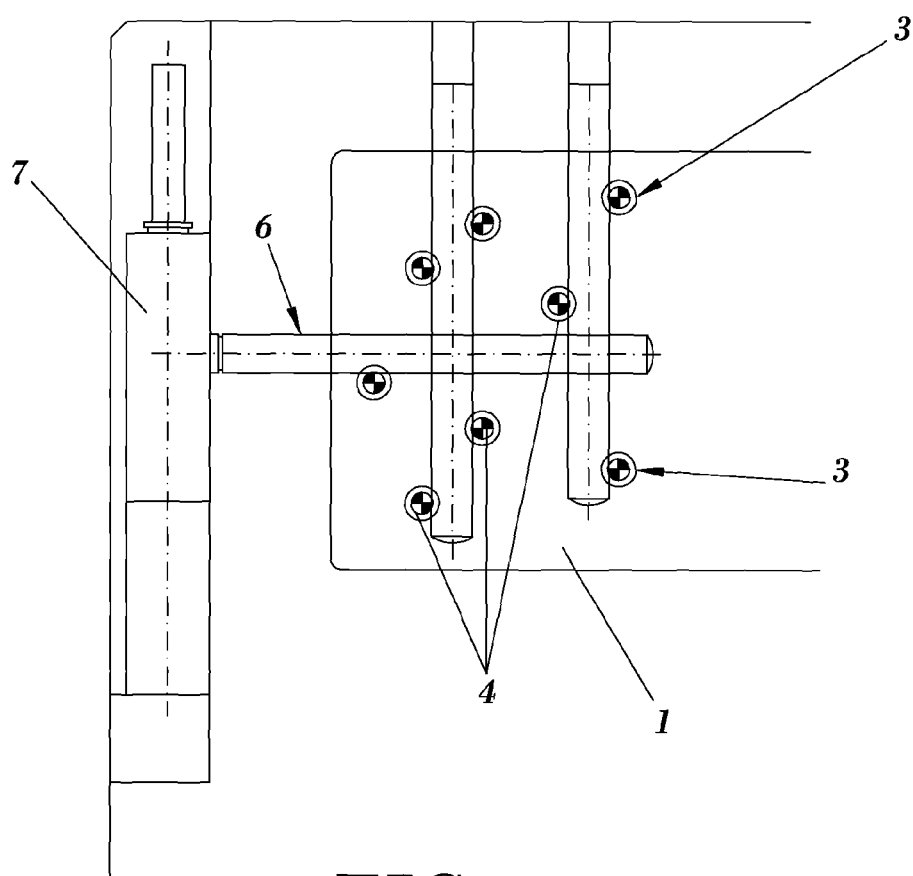

As can be seen in the figures, the injection mold (1) with inner air extraction of the present invention is structured, according to a preferred embodiment of the invention, based on closing means (not depicted), one or more injection cavities (2) provided with at least one injection nozzle (not depicted) for introducing the hot material in a liquid state and at least one ejector device for ejecting the part which is structured based on a housing (3) for an ejector pin (4) which with its movement is responsible for pushing the molded part out.

According to a preferred embodiment of the invention, the mold (1) comprises an air duct (6) connected to a vacuum pump or a suction device (7) transversely intercepting the housing (3) of the ejector pins (4) causing a suction of the air from inside the mold (1) through the existing space between the ejector pin (4) and said housing (3).

Figure 2:
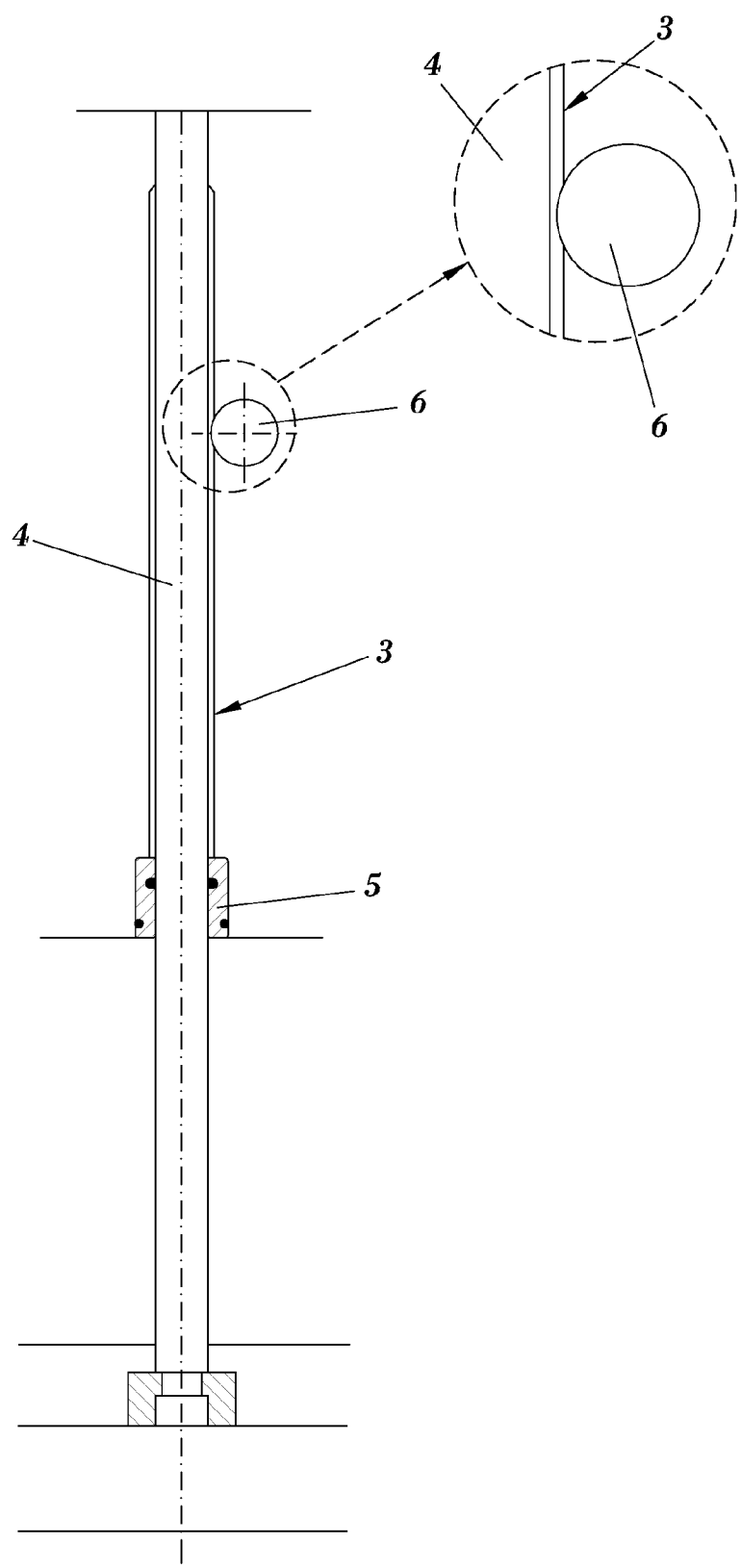
FIG. 2 shows an elevational view of one of the ejectors used in the mold of the previous figure according to a possible embodiment of the invention.
Figure 3:
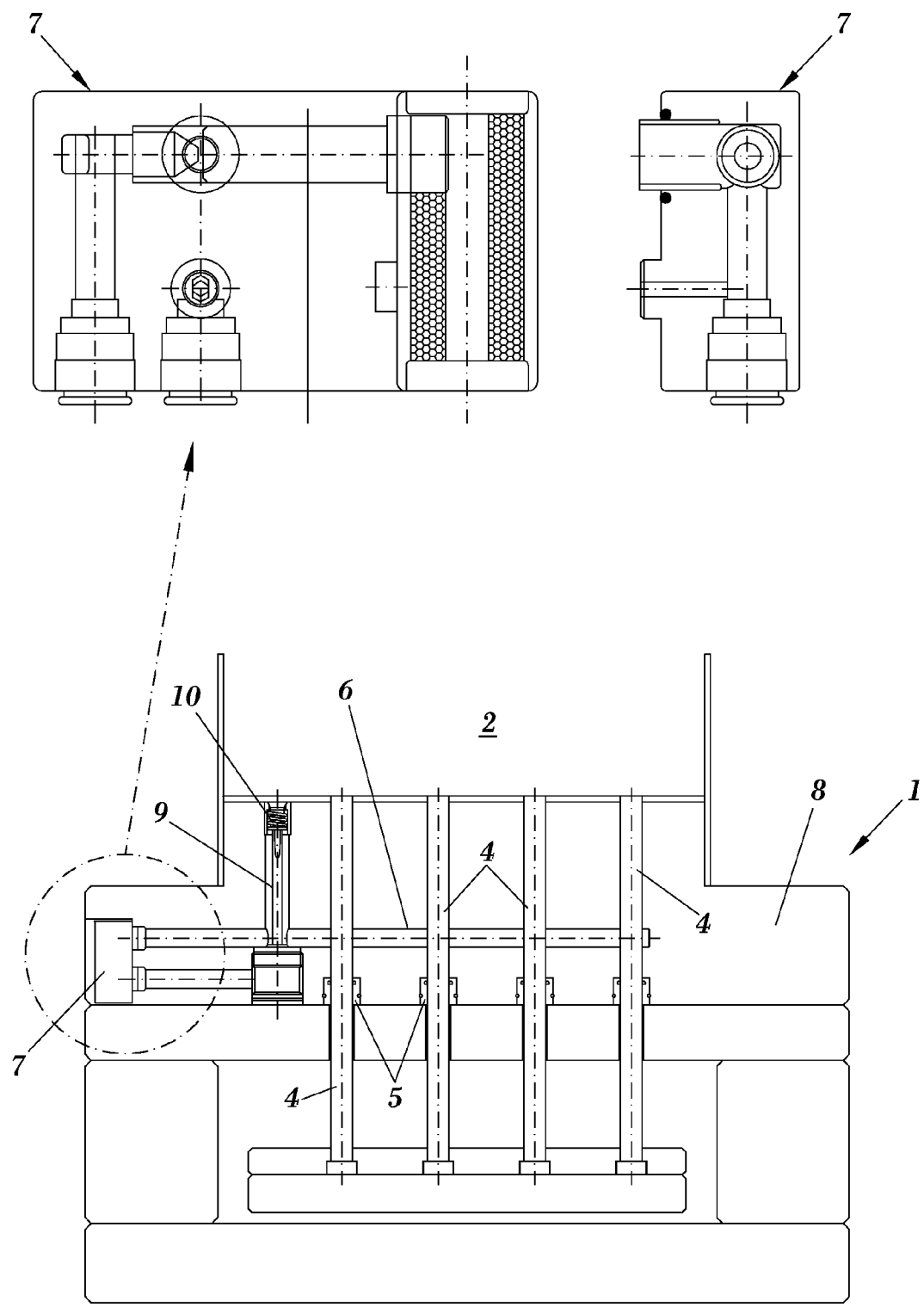
FIG. 3 shows a schematic elevational section view of an injection mold according to a possible embodiment of the present invention and a detail thereof.

Also according to a preferred embodiment of the invention and as can be seen in the figures, especially in FIGS. 2 and 3, the ejector devices have a bushing seal (5) sealing the existing space between the ejector pin (4) and the housing (3) such that said space does not connect with the lower one of greater volume, causing loss of suction effectiveness.

Therefore, for sealing that space between the ejector pin (4) and the wall of the housing (3) said bushing seal (5) is located in the lower portion of the so-called die plate (8).

The space comprised between the housing (3) and the ejector pin (4) must be sufficient for extracting the air from inside but however insufficient for the molten material to be able to escape through it.

To that end, and according to a preferred embodiment of the invention which can be seen in FIG. 2, said housing (3) has two different diameters. It has a smaller diameter located in the proximity of the injection cavity (2) such that the molten material cannot escape through it but does allow the passing of the air, and which is governed by tolerances according to the regulation, in the order of 0.002 mm greater than the ejector pin (4). On the other hand, and as can be seen in said FIG. 2, below the area with said smaller diameter there is another area with a larger diameter producing a widening for the purpose of reducing the friction between said ejector pin (4) and its housing (3), said widening constituting the space transversely intercepting the air duct (6) and through which the air will be extracted from inside the mold (1).

According to another possible practical embodiment of the invention, the air duct (6) which intersects with the housing (3) containing the ejector pin has a sector with a section for causing an increase in circulation rate of the air therethrough and the suction of the air contained in the chamber or injection cavity due to the Venturi effect.

For those cases in which extracting the air from inside the mold (1) is not sufficient with that performed through the ejector devices or if it is necessary to do so more quickly, and according to a possible preferred embodiment of the invention, the mold (1) could furthermore have an additional air removal conduit, as can be seen in FIG. 3, said additional conduit comprising a piston (9) responsible for activating valve means (10) which allow extracting the air also as a result of the intersection with the air duct (6) connected to the suction pump (7).

Said piston (9) and valve (10) elements are furthermore controlled by a timer responsible for indicating the time which this must be open or closed depending on the type of injection process to be performed. The injection process is thus synchronized with the air extraction such that the aforementioned valve (10) closes before the plastic is injected into the injection cavity (2).

Thus, a method of action in the injection manufacture of parts could be derived from the use of the mold (1) described above such that the presence of air inside the mold (1) is prevented, which method would comprise the steps of:
 a) closing the mold (1);
 b) activating the air duct (6) connected to a vacuum pump or a suction device (7) transversely intercepting the housings (3) of the ejector pins (4) of the ejector devices producing the suction of the air from the mold (1).
 c) injecting the plastic into the mold (1).
 d) filling the mold (1); and
 f) cooling and ejecting the part
wherein the air duct (6) and the suction device (7) are activated throughout the entire injection of material into the mold (1).

And wherein, according to the possible embodiment of the invention in which the mold (1) has an additional conduit for air extraction, once the mold (1) is closed and simultaneously with the air extraction through the ejector devices but before injecting the plastic into the mold (1), it comprises the steps of:
 a1) activating the additional conduit and the valve (10);
 a2) extracting the air from inside the mold (1) through the intersection of the air duct (6) with the additional conduit.
 a3) closing the valve (10).

The invention claimed is:

1. Plastic injection mold with inner air extraction comprising:
   one or more injection cavities provided with at least one injection nozzle for introducing a hot material in a liquid state;
   an air duct connected to a vacuum pump or a suction device;
   at least one ejector device formed by a housing for at least one ejector pin of a plurality of ejector pins, responsible for extracting the already molded part wherein the air duct transversely intercepts a plurality of housings of the plurality of ejector pins for causing a suction of the air from inside the mold through the plurality of existing spaces between said plurality of ejector pins and said plurality of housings before and during the injection process; and
   an air removal conduit which intersects with the air duct connected to the suction device, the air removal conduit comprising a piston responsible for activating a valve located adjacent to the one or more cavities and wherein the valve closes before the plastic is injected into the cavity.

2. Plastic injection mold with inner air extraction according to claim 1, wherein the ejector devices have a bushing seal sealing the existing space between the ejector pin and the housing.

3. Plastic injection mold with inner air extraction according to claim 2, wherein the bushing seal is placed in each of the ejection devices, duly fixed in a die plate.

4. Plastic injection mold with inner air extraction according to claim 1, wherein the piston and the valve are both controlled by a timer responsible for indicating the time which said valve must be open or closed depending on the type of injection process to be performed.

5. Plastic injection mold with inner air extraction according to claim 1, wherein the air duct which intersects with the housing containing the ejector pin has a sector with a reduced section for causing an increase in the circulation rate of the air therethrough and the suction of the air from a chamber due to the Venturi effect.

6. Extraction method for extracting the air in the injection mold of claim 1, which comprises:
   a) closing the mold;
   b) activating the air duct connected to a vacuum pump or a suction device, wherein the air duct transversely intercepts the plurality of housings of the plurality of ejector pins of the ejector devices and an air removal conduit, producing the suction of the air from the mold, wherein the air removal conduit includes a piston responsible for activating a valve and is connected to at least one injection cavity;
   c) injecting the plastic into the mold;
   d) filling the mold; and
   f) cooling and ejecting the part
wherein the air duct and the suction device are activated throughout the entire injection of material into the mold and wherein the valve closes before the plastic is injected into the cavity.

7. Extraction method for extracting the air in the injection mold according to claim 6, wherein once the mold is closed, simultaneously with the air extraction through the ejector devices but before injecting the plastic into the mold, it additionally comprises the steps of:
   a1) activating the air removal conduit and the valve;
   a2) extracting the air from inside the mold through an intersection of the air duct with the conduit; and
   a3) closing the valve.

* * * * *